July 24, 1962 D. W. BYRNES 3,045,612
ANIMAL HUSBANDRY
Filed Jan. 30, 1958 5 Sheets-Sheet 4
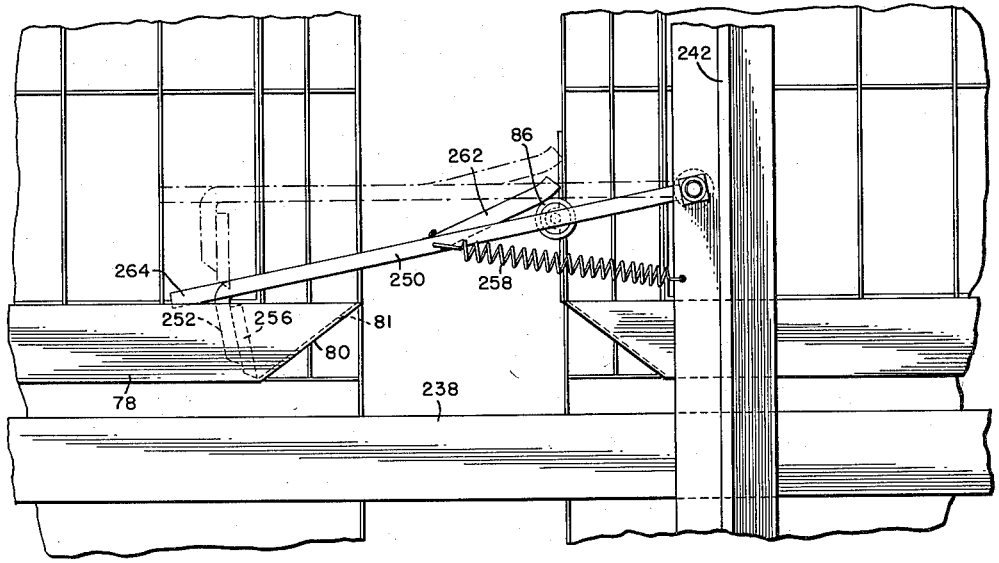
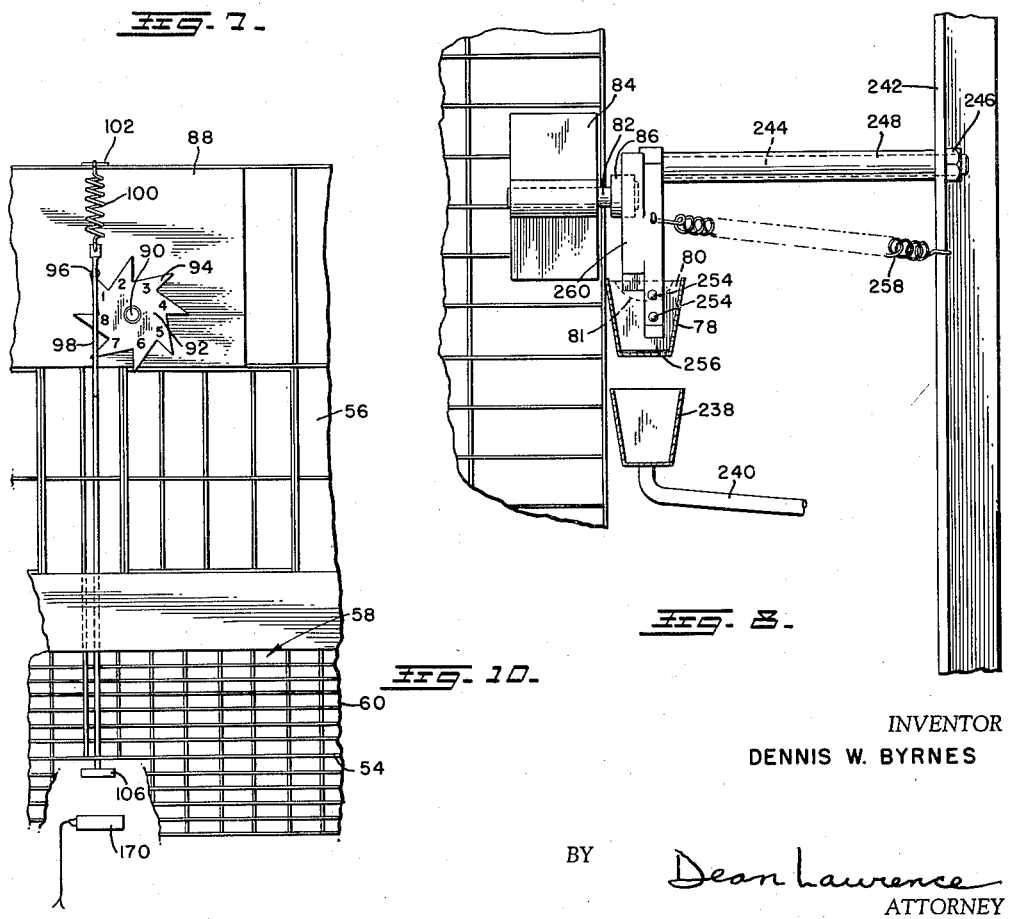
INVENTOR
DENNIS W. BYRNES
BY Dean Lawrence
ATTORNEY

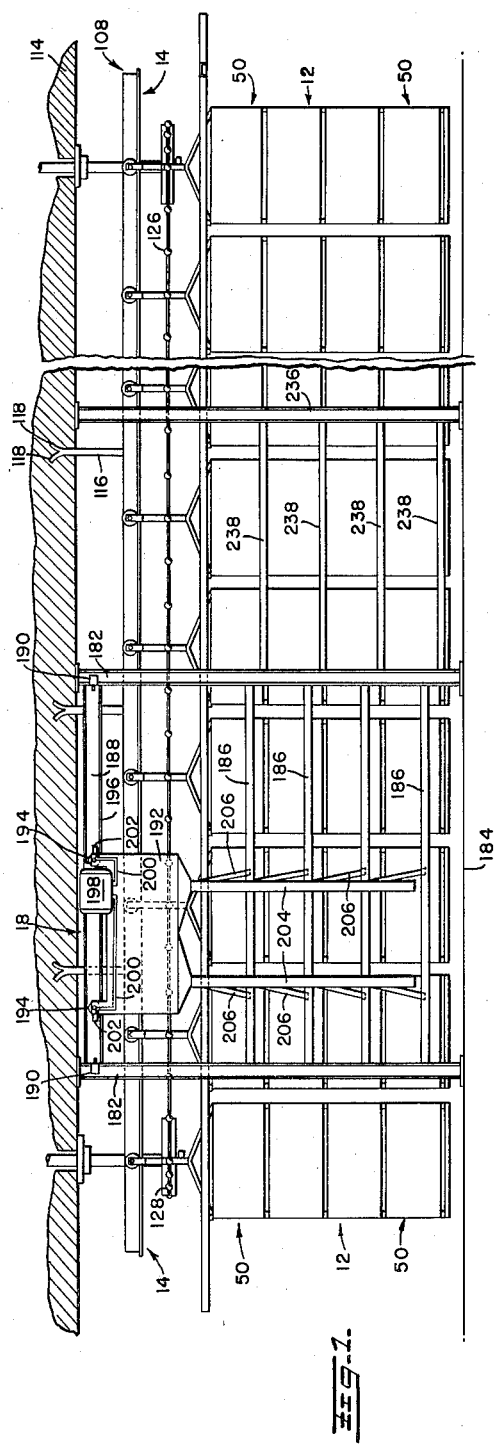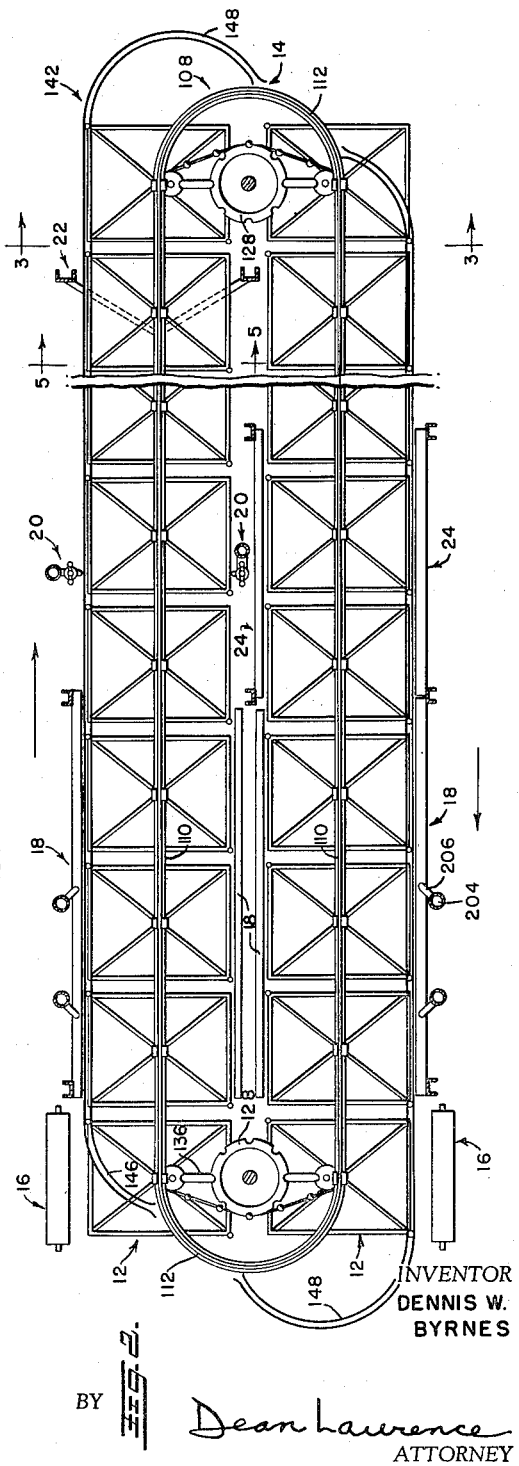

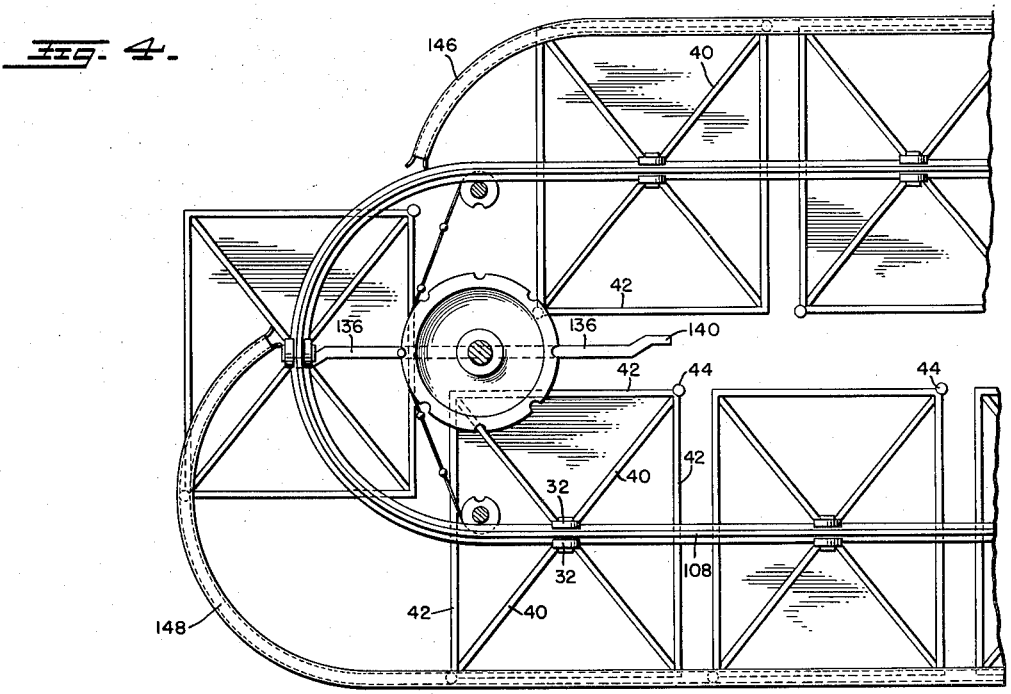
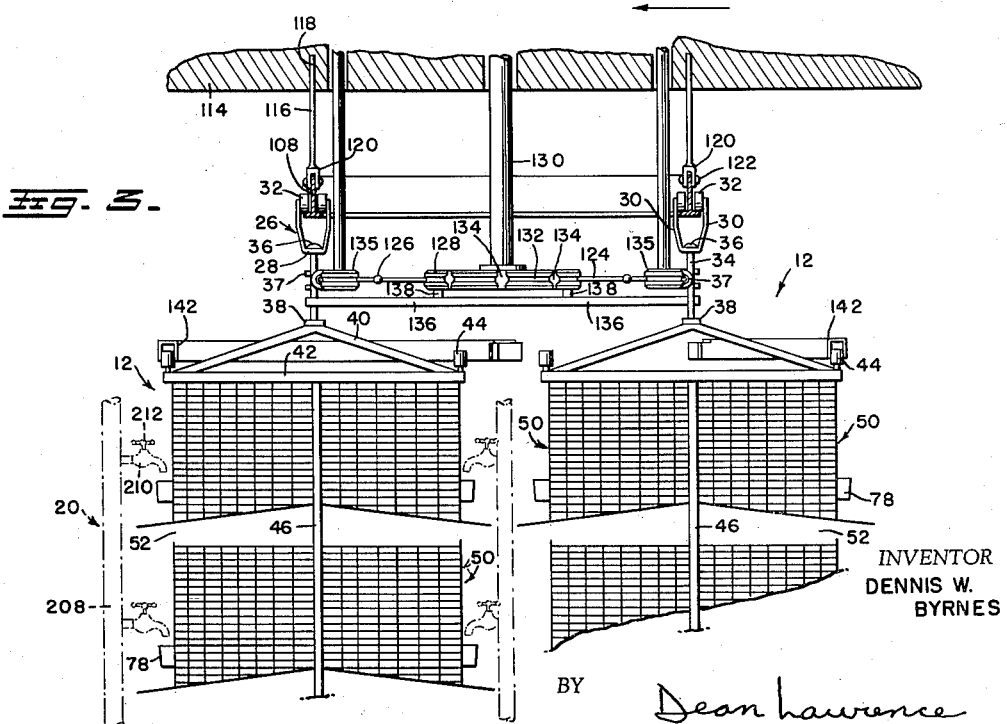

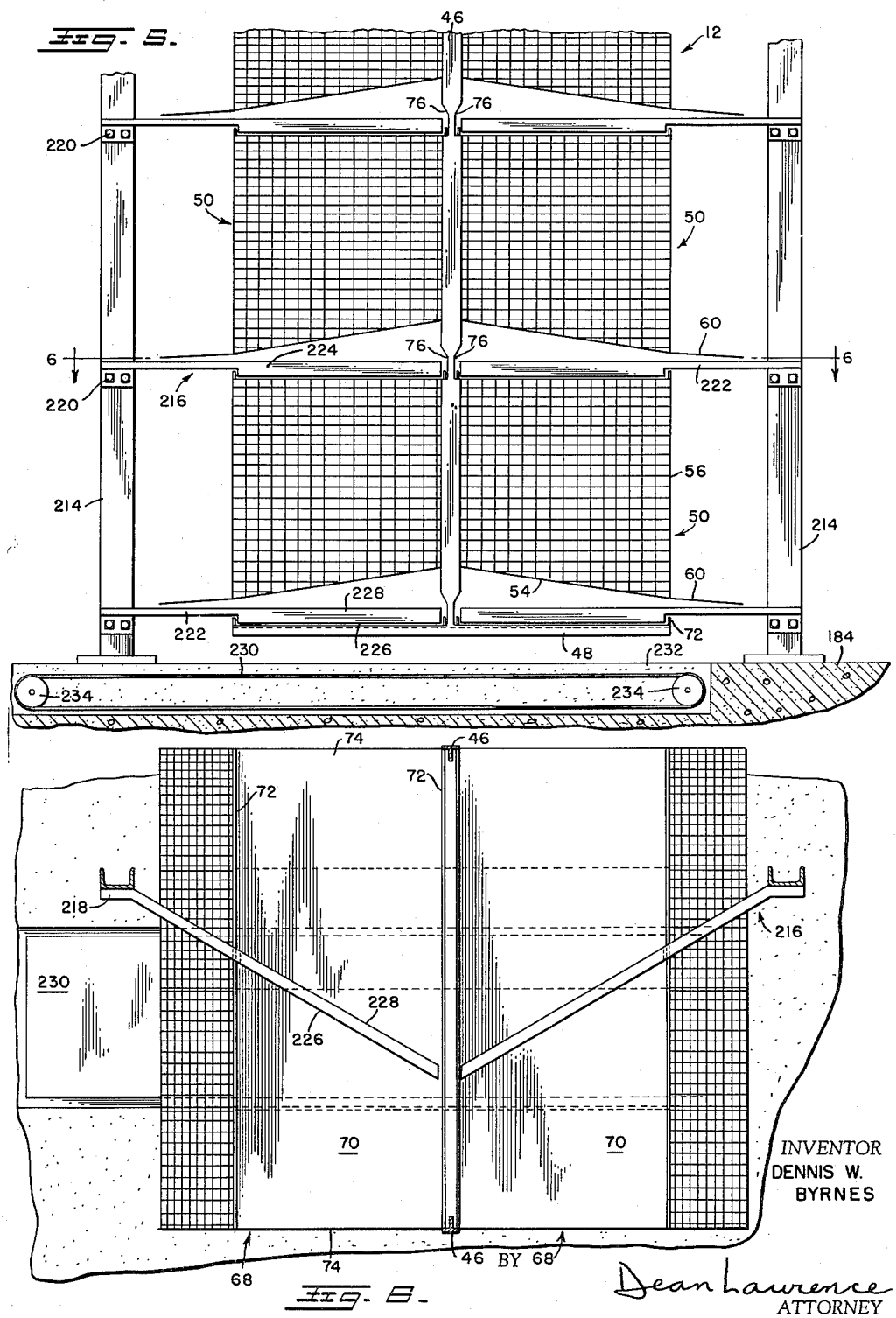

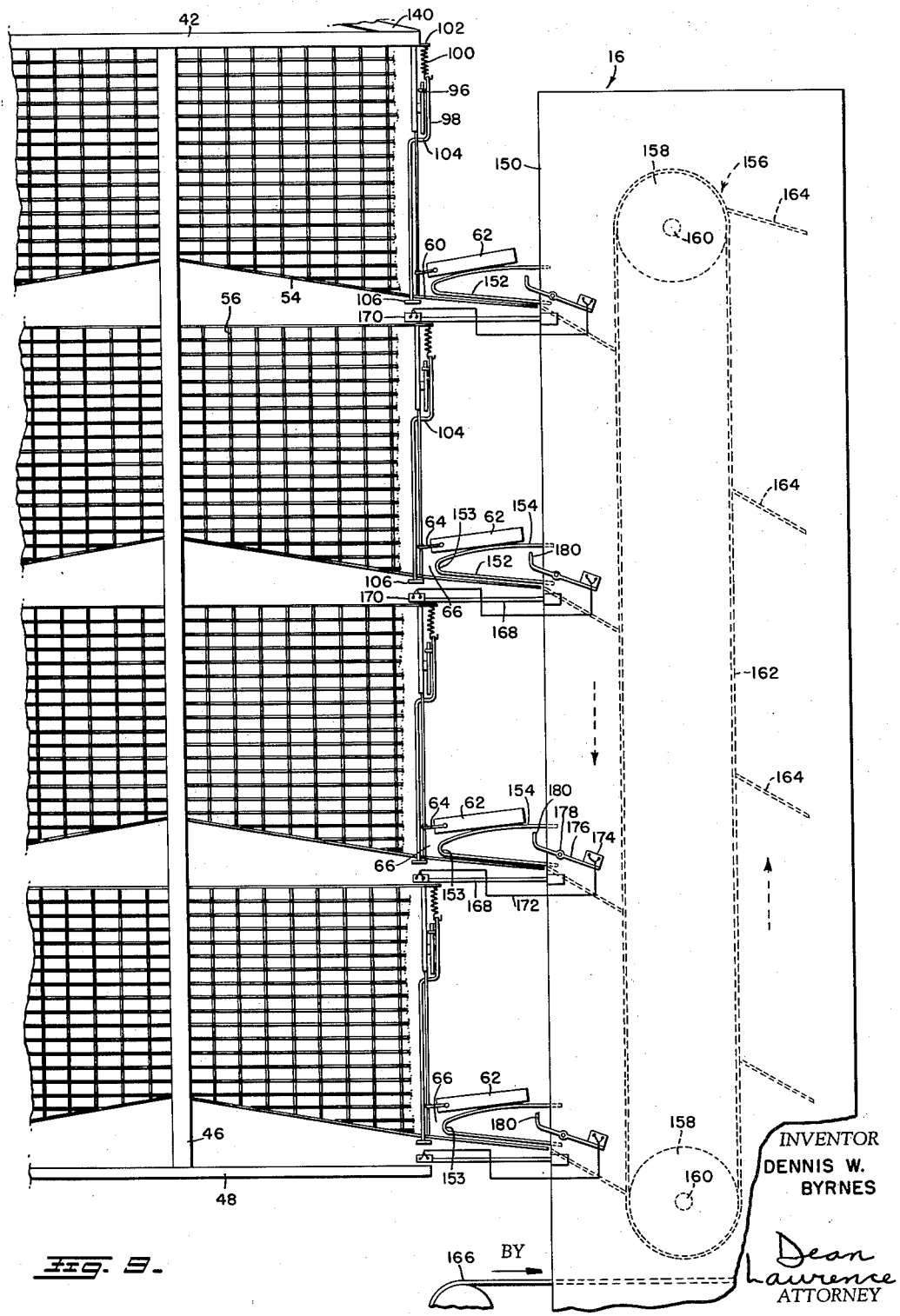

United States Patent Office 3,045,612
Patented July 24, 1962

3,045,612
ANIMAL HUSBANDRY
Dennis W. Byrnes, 4565 S. 6th St., Tucson, Ariz.
Filed Jan. 30, 1958, Ser. No. 712,118
6 Claims. (Cl. 104—178)

The present invention relates to animal husbandry, and more particularly relates to apparatus and process for the husbandry of small animals.

The growing and processing of small animals is a tremendous industry. In the United States, consumption of whole chickens including fryers and broilers requires that huge facilities be devoted to the breeding and raising of chickens to meet the demand of the market for the whole birds. In addition, the fresh egg industry has reached gigantic proportions. It can be estimated that there are over 300 million laying hens in the United States at the present time. The market demand for whole turkeys has grown tremendously and has great peaks for Thanksgiving and Christmas. Thus the significance of the small animal industry, and of improvements leading to greater efficiency in that industry, is readily apparent.

Previous attempts have been made to provide apparatus for growing small animals, such as laying hens. Many of these prior systems have provided means for conveying animal cages in an endless path including two widely spaced straight portions and curvilinear end portions connecting the adjacent ends of the straight portions in which the cages are rotated around the curvilinear end portions, so that the same side of each cage is always on the outside of the endless path. In such systems, where the cages are close together on the straight portions of the path, it is necessary to have curved end portions of large radius of curvature since the inside corners of the cages approach each other on the curved portions of the path. This large radius of curvature of the curved end portions of the path results in a wide wasted area between the straight portions of the path.

Other prior apparatus has provided cumbersome devices for removing and counting eggs from cages of laying hens.

The present invention resides in the concept of an animal hubandry system comprising means for conveying a plurality of animal cage assemblies in an endless path having two parallel straight portions and two curved end portions by translation motion only so that successive positions of the cage assemblies are parallel to all other positions, the linear speed of the cage assemblies on the curved portions of the path being greater than on the straight portions, whereby the straight portions of the path can be located closely adjacent each other; and means for filling the growing needs of the animals such as, means for supplying water to water troughs on the cage assemblies; means for removing deposited manure from the cage assemblies that are designed to permit the continuous removal of manure therefrom; means for cleaning the water troughs on the cage assemblies; means for supplying feed to the animals of the cages; and, where the cages contain laying hens, means for collecting and counting the eggs layed by the hens.

It is thus a primary object of the invention to reduce the amount of floor area required for the complete maintenance of a small animal, such as a laying hen, by providing a conveyor that moves cage assemblies in an endless path by translation motion only so that all successive positions of the cages are parallel to each other and at a greater linear speed on the curved end portions of the path than on the straight portions.

A further object of the invention is to provide an animal cage assembly for rotatable suspension from a conveyor and including a plurality of vertically-spaced groups of cages with foraminous bottoms extending outwardly from a central vertical support and manure trays beneath and spaced from each cage group constructed so that stationary scrapers may remove the manure from the manure trays as the cage assemblies are moved past the scrapers.

A further object of the invention is to provide an animal cage assembly for rotatable suspension from a conveyor and including a plurality of vertically-spaced groups of cages attached to a central support, manure trays beneath each cage group, and egg trays at the side of each cage for releasably holding eggs produced by the animals in the cages.

A further object of the invention is to provide an animal husbandry system including a plurality of cages having water troughs thereon movable in an endless path and a water trough cleaning station mounted adjacent the endless path.

A further object of the invention is to provide an animal husbandry system including a plurality of cages movable in an endless path and a feeding station mounted adjacent the endless path.

A further object of the invention is to provide an animal husbandry system including a plurality of hen cages movable in an endless path and an egg collecting and counting station mounted adjacent the endless path including means for removing the eggs from the cages and controlling a dial on each cage which displays the total of eggs removed from that cage.

Further objects and advantages of the invention will be apparent upon reference to the following specification and drawings, wherein:

FIGURE 1 is a side elevation view, showing some parts schematically, of an animal husbandry system according to the invention.

FIGURE 2 is a top plan view of the system shown in FIGURE 1, some of the parts being shown schematically.

FIGURE 3 is a fragmentary vertical sectional view taken along the lines 3—3 in FIGURE 2.

FIGURE 4 is a detailed top plan view of the end portion of the system shown in FIGURE 3.

FIGURE 5 is a fragmentary vertical sectional view taken along the lines 5—5 in FIGURE 2.

FIGURE 6 is a horizontal sectional view taken along the lines 6—6 in FIGURE 5.

FIGURE 7 is a vertical fragmentary longitudinal view of a water trough cleaning and draining device employed in the system illustrated in FIGURE 1.

FIGURE 8 is a transverse fragmentary vertical view of the water trough cleaning and draining device illustrated in FIGURE 7.

FIGURE 9 is a transverse vertical view showing an egg collecting and counting station employed in the system illustrated in FIGURE 1.

FIGURE 10 is a fragmentary longitudinal elevation view of a portion of the egg counting device illustrated in FIGURE 9.

The animal husbandry apparatus and system illustrated in the drawings is adapted for laying hens such as chicken hens. The apparatus includes a plurality of horizontally-spaced cage assemblies 12 each rotatably suspended from and driven by an endless conveyor generally indicated by the numeral 14. Adjacent the endless path of movement of the cage assemblies, a number of cage servicing stations are located. These servicing stations include a pair of egg collecting and counting stations 16, two pair of feeding stations 18, a pair of water trough filling stations 20, a manure removal station 22, and a pair of water trough cleaning stations 24.

Each cage assembly 12, as seen in FIGURE 3, includes a generally U-shaped trolley 26 having a horizontal bottom portion 28 and upstanding vertical legs 30. Wheels 32 are rotatably secured to the upper inner sides of legs 30 and ride on a T-shaped rail or track later described. A suspension rod 34 extends through an aperture in bottom portion 28 of trolley 26 and rotates freely therein. The suspension rod has an enlarged head 36 wider than the aperture in the bottom portion 28 for maintaining the suspension rod connected to the trolley. Two U-shaped clevises 37 are welded to opposite sides of each suspension rod 34 for engagement by a drive cable later described. A plate 38 is secured, as by welding, to the lower end of suspension rod 34.

Four braces 40 are rigidly connected to the plate 38 and extend downwardly and outwardly therefrom to the corners of a top frame formed by four horizontal bars 42. The direction of travel of the cage assemblies is shown by the arrows extending alongside the cage assemblies in FIGURES 2 and 4. As seen in these figures, two guide posts 44 extend upwardly from the top frame, one at the leading outside corner and the other at the trailing inside corner of the frame.

To form a support for the groups of cages, a pair of vertical central support members 46 extend downwardly from the middle of bars 42. As seen in FIGURE 5, a cage bottom 48 is secured to the lower ends of central support bars 46. A plurality of vertically spaced cage groups 50 are secured to bars 46 and extend outwardly therefrom with spaces 52 between vertically-spaced cage groups 50. Each cage group 50 can include a plurality of horizontally-adjacent cages. The cages are formed of wire mesh sides, ends, and bottoms. The mesh of the bottoms 54 is chosen of the proper fineness so that the manure droppings of the hens passes through the mesh but the eggs will roll freely on the bottoms as seen in the lower portion of FIGURE 10. The sides 56 of the cages are formed of wider mesh than the bottoms 54, as seen in the upper portion of FIGURE 10, so that the hens can project their heads and necks out through the openings to feed and water themselves. Each side 56 of a cage group 50 terminates a distance above the bottom 54 to produce an opening 58 at the bottom of the side 56. The bottom 54 is secured to the central support bars 46 and extends inclinedly downwardly and outwardly therefrom for a distance beyond the side 56 to form an egg tray 60. An egg guard 62, formed of a material such as a synthetic resin plastic that will not shatter eggs on impact, extends along the egg tray 60. Connecting links 64 pivotally connect the ends of the egg guard 62 to the corners of each cage in the cage group 50 at points above the bottom 54 so that there is always an aperture 66 between the ends of the egg guard 62 and the egg tray 60.

In order to collect the manure dropped through the bottom 54 of each cage group 50, a manure tray 68 is positioned beneath and spaced from each cage group 50. Each manure tray 68 includes a flat bottom 70, upstanding edges 72 at both sides of the tray, and open ends 74. Two manure trays 68 rest in cage assembly bottom 48. Manure trays are mounted on top of cage groups 50 and form the tops thereof, except for the uppermost cage groups 50 which have sheet metal tops. The central support bars 46 are cut away adjacent the manure trays at 76 to permit complete removal of manure from the trays in a manner later described.

In order to provide for the watering of the hens, water troughs 78 are secured as by welding to the sides of cage groups 50. The troughs have end plates 80 extending diagonally upwardly. The upper edges of the end plates 80 have arcuate indentations 81 formed therein to permit removal of water and other material from the water troughs by means later described. To control the movement of this later described means for cleaning the water troughs, each cage group 50 has an axle 82 secured thereto by a plate 84. A roller 86 is rotatably mounted on axle 82, as seen in FIGURES 7 and 8.

On a side of each cage in each cage group 50, means are provided for displaying the cumulative total of eggs removed from the cage. This means includes, as seen in FIGURE 10, a plate 88 secured to the side of the cage, a pin 90 secured to the plate 88 and extending outwardly therefrom, and a dial 92 rotatably but frictionally tightly mounted on pin 90 and having ratchet teeth 94 around the circumference. Successive numerals are marked adjacent each ratchet tooth 94, the uppermost numeral indicating the current cumulative total of eggs removed from the cage. The dial 92 is rotated in a step-by-step fashion by a pawl 96 secured to and extending from a rod 98. A tension spring 100 extends from the upper end of rod 98 to a plate 102 secured to plate 88 and urges the rod and pawl upwardly, as seen in FIGURE 10, out of engagement with ratchet teeth 94. The rod 98 has a horizontal offset portion 104, as seen in FIGURE 9 and a magnetically-responsive armature 106 secured to its lower end. The armature is attracted by an electromagnet, later described to cause a lowering of rod 98 and pawl 96 to advance dial 92 to display the next higher numeral in the uppermost indicating position.

Instead of the laying hen cage assemblies illustrated, cages constructed for frying or broiling chickens may be employed in the apparatus of the invention. Such cages will have flat, not inclined bottoms and will have no egg-counting dials. Otherwise, their construction will be similar to that shown for the laying hens.

The endless conveyor generally indicated by the numeral 14 in FIGURES 1 and 2 is more specifically illustrated in FIGURES 3 and 4. The conveyor includes a T-shaped rail generally indicated by the numeral 108 and including two parallel adjacent straight portions 110 and two curved portions 112 connecting adjacent pairs of ends of straight portions 110. Rail 108 is rigidly suspended from room ceiling 114 by bars 116 having upper ends 118 flared in the ceiling 114 and bifurcated lower ends 120 embracing the rail 108. Rivets 122 firmly connect the bifurcated ends 120 to the rail 108.

The cage assemblies rotatably suspended from the rail 108 are moved along the straight portions 110 by an endless drive cable 124 having uniformly-spaced drive balls 126 formed therein for drivingly engaging the clevises 37 on suspension rods 34 of animal cage assemblies 12. The drive cable is driven by two drive wheels 128 each rigidly secured to the lower end of a drive shaft 130 at opposite ends of the conveyor. The drive shafts 130 are positively driven by drive means, such as an electric motor, not shown. The peripheries of the drive wheels 128 have a circumferential groove 132 formed therein for the drive cable 124 and uniformly spaced concave indentations 134 formed therein to receive the drive balls 126. Idler pulleys 135 maintain the drive cable in taut position.

To provide means for conveying the cage assemblies 12 on the curved portions 112 of the rail 108, drive arms 136 are rigidly secured by studs 138 to drive wheels 128. Drive arms 136 extend on a projected diameter of drive wheel 128 and have offset end portions 140 for engaging the suspension rods 34 of cage assemblies 12.

To guide the cage assemblies 12 and maintain their successive positions parallel, a pair of slotted guide members 142 are suspended from ceiling 114 by conventional supports (not shown). Each guide member 142 has a straight portion 144, a short inwardly curved portion 146 at one end, and a long inwardly-curved portion 148 at the opposite end. The extreme ends of the guide members are flared to permit ready entry of the guide posts 44 extending upwardly from the cage assemblies 12.

One of the egg collecting and counting stations 16 is specifically illustrated in FIGURES 9 and 10. The station includes an enclosure 150. A plurality of egg guard lifters 152 have their ends secured to the enclosure 150. Each egg guard lifter has an outer end 153 adapted to enter the aperture 66 between the egg guard 62 and the egg tray 60. Each egg guard lifter has an upper contour 154 extending upwardly and outwardly to effect a lifting of the egg guard 62. For receiving the eggs from the egg trays, a vertical conveyor generally indicated 156 moves within the enclosure 150. The conveyor includes two drive wheels 158 rigidly mounted on shafts 160 rotated by conventional means such as an electric motor (not shown). A flexible conveyor belt 162 is rove around drive wheels 158 and is continuously driven thereby. The conveyor belt 162 has spaced rigid flights 164 extending outwardly therefrom for receiving eggs from the egg trays 60. The direction of movement of the flights 164 is shown by the dotted arrows in FIGURE 9. A horizontal conveyor 166 extends beneath vertical conveyor 156 to receive eggs therefrom and convey the eggs to adjacent rooms for further processing such as candling and packaging.

Control means are mounted on the enclosure 150 shown in FIGURE 9 for causing the rotation of each egg-indicating dial 92 on each cage in response to the passage of an egg from the egg tray 60 to the vertical conveyor flight 164. Each control means includes a support arm 168 extending outwardly from enclosure 150 and having an electromagnet 170 secured to its outer end at a position just beneath the path of movement of armature 106. The electromagnet 170 is supplied with electric current through lead 172 extending from micro-matic switch 174. The switch receives electric power from a conventional source (not shown) and is controlled by a lever 176 pivoted at 178. The lever has an up-turned end 180 to be engaged and rotated upwardly by an egg passing from egg tray 60 to a vertical conveyor flight 164. The switch 174 is of a commercially available type that, upon clockwise pivoting of lever 176 as seen in FIGURE 9, sends a pulse of electric current of predetermined duration of time to the electromagnet 170. After the expiration of the predetermined duration of time, the flow of current to the electromagnet 170 automatically ceases.

Four feeding stations 18 are diagrammatically indicated in FIGURE 2. Each feeding station 18, as seen in FIGURE 1, includes two vertical stanchions 182 extending from floor 184 to ceiling 114. Horizontal feed troughs 186 extend between the stanchions 182 at the levels of the cage groups 50 of cage assemblies 12 to permit the hens to eat the feed from the troughs as the cages pass by the troughs. A carriage rail in the form of an I-beam 188 extends between the upper ends of stanchions 182. Abutments 190 are mounted on each stanchion 182 adjacent the ends of the I-beam 188. A feed bin 192 is mounted for reciprocating movement along I-beam 188. Wheels 194 are rotatably journaled in feed bin 192 and roll on flange 196 of I-beam 188. In FIGURE 1, wheels 194 are shown on one side of I-beam 188. In order to provide a stable suspension of the feed bin 192 from the I-beam, a duplicate set of wheels 194 ride on a lower flange of I-beam 188 on the opposite side, in a manner obvious to one of ordinary skill in the art. The feed bin 192 is reciprocated by an electric motor 198 receiving power from bus bars (not shown) driving a wheel (not shown) engaging the flange 196 of I-beam 188. Electric leads 200 extend from motor 198 to switches 202 located at opposite ends of the feed bin 192. The switches engage the abutments 182 as the feed bin 192 reaches each end of the I-beam 188 and effects a reversal of the electric motor 198 to reverse the direction of motion of the feed bin 192 on the I-beam 188.

To distribute the feed from the feed bin to the feed troughs 186 as the feed bin is reciprocated, main vertical conduits 204 extend downwardly from the feed bin. Branch conduits 206 extend diagonally downwardly from vertical conduits 204 and terminate within the feed troughs 186.

The water trough filling stations 20 are shown in FIGURE 3 (in phantom lines because they are not in their relative position in the system as shown in FIGURE 2) and include a vertical water pipe 208 receiving fresh water pressure from a conventional source (not shown) and a plurality of vertically-spaced spigots 210 having handles 212 for dispensing water to the water troughs 78.

The manure removal station 22 is shown in detail in FIGURES 5 and 6 and includes a pair of vertical posts 214 rigidly mounted on floor 184 and extending upwardly therefrom. Manure scrapers generally indicated by the numeral 216 have mounting plates 218 secured by bolts 220 to the posts 214. Manure scrapers 216 have arm portions 222 extending diagonally forwardly or upstream in the direction of the oncoming cage assemblies 12. Attached to the arm portions 222 are manure scraper blades 224 having their heights inclined to the vertical so that the lower edges 226 of the blades located forwardly or upstream from the upper edges 228 with respect to the path of movement of the cage assemblies 12. The lower edges 226 of the manure scraper blades are positioned to closely engage and scrape the bottoms 70 of the manure trays 68.

To receive and carry away the manure scraped from the many manure trays, a horizontal conveyor 230 is mounted in an aperture 232 in floor 184 and driven by drive wheels 234 driven by conventional power drive means (not shown).

The water trough cleaning stations schematically indicated by the numeral 24 in FIGURES 1 and 2 include a vertical stanchion 236 extending from floor 184 to ceiling 114. Drain troughs 238 extend between stanchion 236 and a stanchion 182 at levels to receive water and other material scraped from the water troughs 78. Each drain trough 238 has a conduit 240 extending from the bottom thereof to a sewer (not shown), as seen in FIGURE 8. Referring to FIGURE 7, a rigid standard 242 extends vertically adjacent drain troughs 238. A bar 244 has its threaded end extending through an aperture in standard 242 and secured in position by a nut 246. A hollow tube 248 fits around bar 244 and freely rotates thereon. A water trough scraper arm 250 is rigidly secured to the end of hollow tube 248 and extends perpendicularly thereto. The outer end of arm 250 is bent downwardly at 252 and secured by rivets 254 to a rubber scraper 256 having an outer shape mating the inside of each water trough 78 to form a tight engagement therewith. A tension spring 258 extends from arm 250 to standard 242 and urges the rubber scraper 256 downwardly into scraping engagement with the inside of each water trough 78.

To lift the scraper 256 out of each water trough at the end of the water trough and hold the scraper up until the next water trough has reached position below the scraper, a guide 260 is integrally secured to the scraper arm 250 and is positioned to engage roller 86 mounted on each cage group 50. The guide 260 includes an upturned portion 262 and a straight portion 264 extending for a distance beyond the scraper 256.

Now the operation of the embodiment of the invention shown in the drawings will be described. Cage assemblies 12 are filled with laying hens and suspended at close intervals from conveyor rail 108. The drive wheels 128 are rotated by their shafts 130 and the drive cable 124 is continuously moved to cause drive balls 126 to engage clevises 37 on the cage assemblies 12 and move the cage assemblies along the straight portions 110 of the rail 108. The guide posts 44 extending upwardly from the cage assemblies 12 slide in straight portions 144 of guide members 142 and maintain the cage assemblies parallel to one another.

When a cage assembly 12 reaches the end of a straight portion 110 of conveyor rail 108, the drive cable 124 disengages from the cage assembly as the cable passes inwardly around the drive wheel 128. At this point, a drive arm 136 engages the suspension rod of the cage assembly 12 and moves the cage assembly around the curved portion 112 of the conveyor rail 108 at a greater linear speed than the drive cable 124 moved the cage assembly along the straight portion 110. As will be seen in FIGURE 4, the inwardly curved portions 146 and 148 of the guide members 142 are shaped to engage the guide posts 44 and maintain the successive positions of the cage assembly parallel to all other positions thereof and parallel to adjacent cage assemblies. Thus the cage assembly moves by translation motion only, no portions of the cage assembly being rotated to jam against adjacent cage assemblies. The increased linear speed of the cage assembly as it is moved around the curved portion moves the cage assembly rapidly out of the way of the next cage assembly. This feature combined with the parallel relationship of the cage assembles at all position permits the straight portions 110 of the conveyor rails to be located closely adjacent each other, with little waste space between the adjacent rows of cage assemblies 12.

The speed of movement of the cage assemblies must be sufficient to service the hens with sufficient regularity but not too great as to disturb or frighten the hens. A suggested speed along the straight portions 110 is about one foot per minute.

When a cage assembly reaches an egg collecting and counting station 16, the outer end 153 of each egg guard lifter 152 enters the aperture 66 between the egg guard 62 and the egg tray 60. Further movement of the cage assembly causes the egg guard to ride up on the contour 154 of the egg guard lifter. This releases the egg which falls off the egg tray 60, pivots the up-turned end 180 of lever 176 clockwise as seen in FIGURE 9, and falls onto the flight 164 of vertical egg conveyor 156. The vertical egg conveyor carries the eggs down to horizontal egg conveyor 166 which removes them to an adjacent room for further processing.

The pivoting of lever 176 initiates the action of switch 174 to send an electric pulse to electromagnet 170. The energized electromagnet draws armature 106, rod 98 and pawl 96 downwardly against the tension of spring 100 to rotate dial 92 one step and display the next high numeral indicating the total number of eggs removed from that cage.

As the cage assemblies pass the feeding stations 18, the hens eat the feed from the feed troughs 186. Reciprocating feed bin 192 continuously replenishes the feed in the troughs.

At water trough filling station 20, the water troughs are filled with fresh water by operation of the spigot handles 212.

As the cage assemblies pass the manure removal station 22, manure scraper blades 224 scrape manure from the bottoms of manure trays 68. The manure falls upon horizontal conveyor 230 which conveys it to a disposal point.

As each cage assembly 12 approaches the water trough cleaning station 24, the roller lifter 86 engages upturned portion 262 of guide 260 and lifts the scraper 256 out of the preceding water trough 78. When the straight portion 264 of the guide 260 rolls off the roller 86, the next water trough 78 is beneath scraper 256. At this time, the spring 258 pulls the scraper downwardly into tight scraping engagement with the bottom and sides of the water trough 78. As the scraper moves relatively down the length of the water trough 78, the water and other material drain out of the arcuate indentation 81 in the end plate 80 and down into the drain trough 238 from which it moves through conduit 240 to a sewer.

Thus the invention provides a unitary device for housing laying hens in a minimum of floor space and providing many necessary services to the hens in a continuous and automatic manner.

The invention may be embodied in other specific forms without departing from the spirit or essential characteristics thereof. The present embodiments are therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for animal husbandry comprising an endless conveyor including two closely-adjacent parallel substantially-rectilinear portions and two curvilinear portions connecting adjacent pairs of opposite ends of said substantially-rectilinear portions; a plurality of animal cage assemblies mounted on said endless conveyor for movement in an endless path by said endless conveyor, said animal cage assemblies being mounted for rotation with respect to said conveyor; said endless conveyor including means for moving said animal cage assemblies in said endless path by substantially translation motion only and for moving said animal cage assemblies at a greater linear speed on said curvilinear portions than on sid substantially-rectilinear portions.

2. Apparatus for animal husbandry comprising: a pair of longitudinal supports extending parallel to and spaced from each other; a pair of curved supports located at opposite ends of said longitudinal supports and connecting said longitudinal supports; a plurality of animal cages movable in a continuous path on said supports and freely pivotally mounted on said supports, said cages being movable in one direction on one said longitudinal support and movable in the opposite direction on the other said longitudinal support; first drive means for moving said cages in said one direction on said one longitudinal support and in said opposite direction on said other longitudinal support; second drive means for moving said cages from the end of one longitudinal support on a said curved support around to the adjacent end of the other longitudinal support at a speed greater than the speed of movement of said cages on said longitudinal supports; and guide means for maintaining the successive positions of said cages parallel to other positions thereof as the cages are moved along each longitudinal support and around the curved supports.

3. Apparatus for animal husbandry comprising: a pair of horizontal straight rails extending parallel to each other and spaced from each other; a pair of curved horizontal rails located at opposite ends of said straight rails and connecting adjacent ends of said straight rails; a plurality of trolleys movably mounted on said rails; a plurality of animal cages each freely pivotally suspended from a said trolley, each said cage having a substantially rectangular cross-section and a pair of guide posts extending upwardly from diagonally opposite corners of the upper surface of said cage; an endless drive cable having portions extending beneath each said straight rail, said cable having projections adjacent each animal cage for drivingly engaging each said cage; a pair of drive wheels each rotatably mounted between adjacent ends of said pair of straight rails and within the curve of said curved rail connecting said adjacent ends of said pair of straight rails, said drive wheels engaging said drive cable; two pairs of drive arms, each pair of drive arms being rotatable integrally with a said drive wheel, each said pair of drive arms extending on a projected diameter of said drive wheel, each said drive arm extending beyond the perimeter of the adjacent drive wheel to a position to engage and move said animal cages around said curved rails at a linear speed greater than the liner speed of said drive cable; a pair of guide members having straight portions extending parallel to said straight rails adjacent the outer surfaces of said animal cages, each said guide member having its ends curved inwardly toward said curved rails, said guide members engaging said guide posts on the upper surfaces of said animal cages to maintain the successive positions of the vertical surfaces of said animal cages substantially parallel to each other during the movement of said animal cages in the continuous endless path along said straight and curved rails.

4. In an animal husbandry system including means for conveying animal cages in a continuous path past a plurality of servicing stations; the improvement in the means for conveying animal cages comprising: a pair of longitudinal supports extending substantially parallel to each other and spaced from each other; a curved support connecting adjacent ends of said longitudinal supports, said longitudinal supports and said curved support determining a path of movement for animal cages; first drive means for moving cages in one direction on one said longitudinal support and in the opposite direction on the other said longitudinal support; second drive means for moving cages around said curved support from the end of one longitudinal support to the adjacent end of the other longitudinal support at a linear speed greater than the linear speed of said first drive means; and guide means mounted adjacent said supports for maintaining the successive positions of cages parallel to other positions thereof as said first and second drive means move cages along said longitudinal supports and around said curved support.

5. In an animal husbandry system including means for conveying animal cages in a continuous path past a plurality of servicing stations; the improvement in the means for conveying animal cages comprising: a pair of substantially horizontal rails extending substantially parallel to each other and spaced from each other; a curved rail connecting adjacent ends of said substantially parallel rails; a plurality of trolleys mounted on said rails for movement along said rails; a plurality of animal cages each freely pivotally suspended from a said trolley, each said cage having a substantially rectangular cross-section and a pair of guide posts extending upwardly from diagonally opposite corners of the upper surface of said cage; an endless drive cable having portions extending beneath each of said pair of substantially parallel rails, said cable having projections adjacent each animal cage for engaging each said cage; a drive wheel rotatably mounted between said adjacent ends of said pair of substantially parallel rails and within the curve of said curved rail, said drive wheel drivingly engaging said drive cable; a pair of drive arms rotatable integrally with each said drive wheel and extending on oppositely directed radii on a projected diameter of said drive wheel, each said drive arm extending beyond the perimeter of said drive wheel to a position to engage and move said animal cages around said curved rail at a linear speed greater than the linear speed of said drive cable; a pair of guide members each having portions extending parallel to and spaced from each of said pair of substantially parallel rails and adjacent said guide posts on said cages, said guide members having their ends curved inwardly toward said curved rail, said guide members engaging said guide posts on the upper surfaces of said animal cages to maintain the successive positions of the vertical surfaces of said animal cages substantially parallel to each other during the movement of said animal cages along said rails.

6. A conveyor apparatus including a pair of longitudinal supports extending parallel to and laterally spaced from each other; a pair of curved supports located at opposite ends of said longitudinal supports and connecting said longitudinal supports; a plurality of members movable in a continuous path on said supports and freely pivotally mounted on said supports; said members being movable in one direction on one of said longitudinal supports and movable in the opposite direction on the other of said longitudinal supports; first drive means for moving said members in said one direction on one longitudinal support and in said opposite direction on the other longitudinal support; second drive means for moving said members from the end of each longitudinal support along a curved support to the adjacent end of the other longitudinal support at a speed greater than the speed of movement of said members along said longitudinal supports; and guide means for maintaining the successive positions of said members parallel to each other as the members are moved along each longitudinal support and around the curved supports.

References Cited in the file of this patent
UNITED STATES PATENTS

| | | |
|---|---|---|
| 1,837,605 | Baker | Dec. 22, 1931 |
| 2,257,734 | Cornell | Oct. 7, 1941 |
| 2,264,156 | Apple | Nov. 25, 1941 |
| 2,305,708 | Jacobsen | Dec. 22, 1942 |
| 2,311,640 | Cornell | Feb. 23, 1943 |
| 2,358,507 | Haberstump | Sept. 19, 1944 |
| 2,383,326 | Lovell | Aug. 21, 1945 |
| 2,448,120 | Petraske | Aug. 31, 1948 |
| 2,536,621 | Arnold | Jan. 2, 1951 |
| 2,620,770 | Drake | Dec. 9, 1952 |
| 2,640,580 | Burgh | June 2, 1953 |
| 2,685,863 | Martin | Aug. 10, 1954 |
| 2,735,400 | Stubbs | Feb. 21, 1956 |